(12) United States Patent
Straßer

(10) Patent No.: US 11,955,912 B2
(45) Date of Patent: Apr. 9, 2024

(54) METHOD FOR OPERATING A MOTOR VEHICLE, AND THE MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/940,900

(22) Filed: Sep. 8, 2022

(65) Prior Publication Data

US 2023/0071273 A1     Mar. 9, 2023

(30) Foreign Application Priority Data

Sep. 9, 2021   (DE) .......................... 102021123322.4

(51) Int. Cl.
| | |
|---|---|
| *H02P 1/00* | (2006.01) |
| *B60H 1/00* | (2006.01) |
| *H02P 23/04* | (2006.01) |
| *H02P 27/08* | (2006.01) |
| *B60L 1/00* | (2006.01) |
| *B60L 15/20* | (2006.01) |

(52) U.S. Cl.
CPC ......... *H02P 23/04* (2013.01); *B60H 1/00428* (2013.01); *H02P 27/08* (2013.01); *B60L 1/003* (2013.01); *B60L 15/20* (2013.01)

(58) Field of Classification Search
CPC .......... H02P 23/04; H02P 27/08; H02P 29/50; H02P 6/10; B60H 1/00428; B60H 1/003; B60H 15/20
See application file for complete search history.

(56) References Cited

U.S. PATENT DOCUMENTS 4,594,648 A    6/1986  Gallios

FOREIGN PATENT DOCUMENTS

| DE | 102011013247 A1 | 3/2012 | |
|---|---|---|---|
| DE | 102017105839 A1 | 9/2018 | |
| EP | 1912321 A2 | 4/2008 | |
| EP | 2816713 A1 | 12/2014 | |
| EP | 3929018 A1 * | 12/2021 | |
| WO | 2015/151399 A1 | 10/2015 | |
| WO | WO-2016180469 A1 * | 11/2016 | ............. B62D 5/046 |
| WO | WO-2017125310 A1 * | 7/2017 | .......... B60L 15/2045 |

\* cited by examiner

*Primary Examiner* — Karen Masih
(74) *Attorney, Agent, or Firm* — Seed IP Law Group LLP

(57) ABSTRACT

A method for operating a motor vehicle having at least one electric machine, which is electrically coupled across a pulse inverter to a DC distribution bus of a high-voltage onboard network of the motor vehicle, includes, by means of a compensation unit electrically coupled to the DC distribution bus, feeding an electric compensation voltage to the DC distribution bus such that ripple of the electric DC voltage present in the DC distribution bus which is caused by the pulse inverter is at least partly compensated.

13 Claims, 7 Drawing Sheets

METHOD FOR OPERATING A MOTOR VEHICLE, AND THE MOTOR VEHICLE

BACKGROUND

Technical Field

Embodiments of the present invention relate to a method for operating a motor vehicle having at least one electric machine, which is electrically coupled across a pulse inverter to a DC distribution bus of a high-voltage onboard network of the motor vehicle.

Description of the Related Art

A high-voltage onboard network of a motor vehicle ensures the power flow between various components of the motor vehicle. The voltage level in a high-voltage onboard network often amounts to several hundred Volts. Components or consumers as well as an electric energy accumulator or a high-voltage battery, which can be operated in the course of a direct current operating mode, are coupled to the DC distribution bus. Moreover, the electric machine, which can be operated in an alternating current mode, is likewise coupled to the DC distribution bus. In order to convert the DC voltage present at the distribution bus side into an alternating voltage at the machine side and vice versa, a pulse inverter is hooked up between the DC distribution bus and the electric machine.

The pulse inverter represents a fast switching component, which burdens the onboard network typically with so-called HV ripple, also known as voltage ripple or simply as ripple. Otherwise put, a varying voltage level is produced in the DC distribution bus on account of a cyclical switching of the power electronics located in the pulse inverter. That is, a constant DC voltage such as is desirable is not present in the DC distribution bus, but rather this DC voltage has variabilities, in particular, harmonics. This is detrimental in that the components or consumers coupled to the DC distribution bus might be damaged in this way.

One way of reducing this problem is the intermediate hooking up of intermediate circuit capacitances or capacitors, which can be provided for example in the pulse inverter. This brings about a smoothing of the ripple. However, intermediate circuit capacitances are often quite cost-intensive and require a lot of design space. This is a drawback.

One concept for reducing voltage fluctuations in an onboard network, especially that of a vehicle, is known from EP 1 912 321 A2. In this system, multiple electric machines are connected across three respective phase converters, having in particular the just mentioned intermediate circuit capacitances, to a DC distribution bus. In this system, a specific setting of the phase shifts between the three phase converters or electric machines is done, so that varying voltage levels in the DC distribution bus are kept as small as possible.

Another system in which this concept based on a deliberate phase shifting for multiple converters or pulse inverters is employed is known from WO 2015/151 399 A1. Solar panels, an electric vehicle, as well as a storage battery are incorporated in particular in this energy distribution system, which pertains to a residential building.

Some embodiments indicate an improved concept for reducing the high-voltage ripples in an onboard network of a motor vehicle.

BRIEF SUMMARY

In some embodiments, by means of a compensation unit electrically coupled to the DC distribution bus an electric compensation, voltage is fed to the DC distribution bus such that ripple of the electric DC voltage present in the DC distribution bus which is caused by the pulse inverter is at least partly compensated.

This may be based on the idea that the ripple can be attenuated or in the ideal case compensated entirely in that the compensation voltage generated by means of the compensation unit that is imposed on the voltage present in the DC distribution bus changes over time such that the time changes caused by the ripple in the voltages present in the DC distribution bus run counter to a temporal variation of the compensation voltage and consequently a corresponding attenuation or compensation of the ripple occurs. By means of the compensation unit, it is possible to provide a DC voltage on the DC distribution bus and to modify it such that a temporal variation of this DC voltage attenuates or compensates the ripple. The compensation unit can be called a voltage source coupled to the DC distribution bus, being coupled in turn, for example, to a high-voltage battery of the motor vehicle, which can be used in particular as a traction battery.

In some embodiments, the ripple is actively compensated. On the contrary, the systems known from the prior art, especially those using the above-described intermediate circuit capacitances for elimination of ripple, realize passive concepts.

The electric machine can be adapted to feed energy to the high-voltage onboard network or to withdraw energy from the high-voltage onboard network. In particular, the electric machine is intended to provide the necessary torque for the propulsion of the motor vehicle, which can be in particular a hybrid or an electric vehicle, this torque being transmitted by a drive train to the wheels of the motor vehicle. But the electric machine can also be operated in a generator or recuperation mode, in which kinetic energy of the motor vehicle is converted into electric energy and fed into the high-voltage onboard network. In this case, it can be provided that the high-voltage battery is charged. The electric machine can be operated as a three-phase electric motor.

The pulse inverter is an electrical device which converts DC voltage into alternating voltage and vice versa. It comprises semiconductor-based electronic components, especially capacitors and/or coils, by means of which the impedances needed for the voltage conversion can be generated. Specific details regarding the design and functioning of corresponding pulse inverters are sufficiently familiar to the skilled person and will not be further discussed in this place.

DC voltage components which can be operated by means of a DC voltage can be electrically coupled to the DC distribution bus. One of the DC voltage components, as already mentioned, can be the high-voltage battery of the motor vehicle. Furthermore, components of an air conditioning system of the motor vehicle and/or a charger by means of which the high-voltage battery can be charged may also be provided as DC voltage components.

A voltage measurement series may be measured, relating to the time variation of the electric voltage in the DC distribution bus, and a control signal is generated in dependence on the voltage measurement series, by means of which the compensation voltage is generated. The voltage measurement series may comprise pairs of values, in which each time a measurement value concerning the time is associated with a voltage value in the DC distribution bus which is present at that time. The compensation of the ripple occurs here directly with the aid of a measurement regarding the electric voltage in the DC distribution bus. Otherwise put, the compensation voltage is generated directly in dependence on currently present voltage values in the DC distribution bus and can be adapted specifically to the situation, in particular. The continuous detecting of the mentioned pairs of values makes it possible for the compensation voltage to also be adapted continuously to any changed circumstances.

For the measurement of the voltage measurement series, a distribution bus sensor can be provided, which can be or comprise a voltmeter and which is connected to the DC distribution bus.

For the generating of the control signal, a control device can be provided, such as a control device of the compensation unit, that of the pulse inverter, or that of the motor vehicle, being connected to the distribution bus sensor for relaying of the measurement values.

It can be provided that with the aid of the voltage measurement series at least one item of ripple information is determined, the control signal being generated with the aid of the ripple information. The ripple information may relate to at least one variable, especially an amplitude and/or a period and/or a phase of an oscillation describing the ripple. Especially because the ripples typically have a periodic behavior, they can be modeled as an oscillation, such as a sinusoidal oscillation, which makes possible a low-cost evaluation of the data. The ripple information can be determined by means of a suitable regression analysis.

By means of the ripple information, the compensation voltage can be generated such that it constitutes an oscillation running counter to the present ripple. This oscillation may correspond to a sine function, having the same amplitude and the same period as the detected ripple information and a phase which is phase-shifted by half a period, or 180°, with respect to the voltage measurement series.

It can be provided that the voltage measurement series is relayed to a phase shifting and/or inverting unit, by means of which a modified voltage measurement series is generated by phase-shifting the voltage measurement series by a substantially half period of the ripple, and the control signal is generated with the aid of the modified voltage measurement series.

It can be provided that an adjusted voltage measurement series is relayed to the phase shifting and/or inverting unit. The adjusted voltage measurement series can be generated by subtracting from the measured voltage values of the voltage measurement series a constant voltage value, being a constant component of the DC voltage present in the DC distribution bus. By means of the phase shifting and/or inverting unit, a modified voltage measurement series is generated by phase-shifting or inverting the adjusted voltage measurement series by a substantially half period of the ripple. The control signal is generated with the aid of the modified voltage measurement series.

As regards the constant voltage value which is subtracted from the measured voltage value, it can be provided that this corresponds to a predetermined nominal voltage in the DC distribution bus. However, the constant voltage value can also be determined by means of a measurement and in particular it can correspond to the current mean value of the voltage present in the DC distribution bus.

Thanks to the use of the phase shifting and/or inverting unit, it is not absolutely necessary to perform a mathematical evaluation of the voltage measurement series in regard to the ripple information, such as a corresponding regression analysis of the measurement values, but instead the control signal is generated directly and with no further evaluation steps by using the measurement values. The phase shifting and/or inverting unit can be an electronic circuit realizing a phase shifter, producing an output voltage which is phase-shifted relative to an input voltage present on the phase shifter and having an oscillation, by a particular frequency, in the present case by around half a period of oscillation or 180°. The specific design of such a phase shifter, especially as regards the connection of any semiconductor-based components of the phase shifter, is sufficiently familiar to the skilled person and therefore will not be further discussed in this place.

As was explained, the phase shifter can shift an imposed electric voltage having an oscillation with a predetermined frequency by a predetermined phase, corresponding in particular to half the period of the oscillation, or 180°. This is especially useful when the ripple always has the same or only slightly differing values for the period. If the values of the period of the ripple are subject to significant changes, it is conceivable to perform a mathematical determination of the current period with the aid of the measurement values, so that a corresponding control signal is put out to the phase shifter, for example by the control device, which can be adapted to the phase shifting of oscillations with different periods. The phase shifting and/or inverting unit can be integrated in the control device or the compensation unit or it can be a separate component.

It can be provided that at least one measurement value relating to an electric voltage and/or electric current strength present in the pulse inverter, in particular on the side with the DC distribution bus and/or on the side with the electric machine, is measured, and with the aid of the measurement value and a known switching behavior of the pulse inverter at least one item of or the ripple information is determined, relating to at least one variable of an oscillation describing the ripple, and the control signal is generated with the aid of the ripple information. By contrast with the above explained embodiment, the ripple information is not generated with the aid of measurement values relating directly to the ripple, but instead measurement values relating to the voltage or the current strength at or in the pulse inverter are determined for this purpose. One makes use of the knowledge that the ripple caused on the part of the pulse inverter or its oscillation variables are known, insofar as certain operating variables of the pulse inverter, especially the present operating voltage and/or the operating current strength, are known.

The ripple information can be calculated analytically by means of a given mathematical relationship. In particular, formulas can be used which make possible a calculation of the oscillation variables in dependence on the measurement value. The ripple information can also be retrieved from a lookup table, which is stored in particular at the control device. The lookup table can contain values regarding the ripple information, i.e., the amplitude and/or phase and/or period of the ripple in dependence on the measurement value, i.e., the measured voltage and/or current strength.

If only a determination of the expected amplitude and period is possible with the aid of the measurement value, the phase can be measured directly or determined with the aid of measured voltage values of the above explained voltage measurement series, especially by using the above described regression analysis.

Some embodiments include a motor vehicle comprising at least one electric machine, which is electrically coupled across a pulse inverter to a DC distribution bus of a high-voltage onboard network of the motor vehicle. In such a motor vehicle, the motor vehicle may comprise a compensation unit electrically coupled to the DC distribution bus, which is adapted and/or designed to feed an electric compensation voltage into the DC distribution bus such that ripple of the electric DC voltage present in the DC distribution bus which is caused by the pulse inverter can be at least partly compensated. All the aspects, benefits and features explained in connection with the method hold equally for the motor vehicle and vice versa.

In the motor vehicle it can be provided that it comprises at least one distribution bus sensor for measuring a voltage measurement series relating to a time variation of the electric voltage in the DC distribution bus, wherein the compensation unit, especially a control device of the compensation unit, is adapted to generating a control signal in dependence on the voltage measurement series, and the compensation voltage can be generated by means of this signal.

In the motor vehicle it can be provided that at least one phase shifting and/or inverting unit is provided, which is in particular a component of the compensation unit, and which is configured and/or adapted to generating a modified voltage measurement series by phase-shifting the voltage measurement series by substantially half a period of the ripple or by phase-shifting or inverting an adjusted voltage measurement series, which has been generated by subtracting from the measured voltage values of the voltage measurement series a constant voltage value, being a constant component of the DC voltage present in the DC distribution bus, by substantially half a period of the ripple, and the compensation unit is adapted to generating the control signal in dependence on the modified voltage measurement series.

Furthermore, it can be provided that the motor vehicle comprises at least one pulse inverter sensor for measuring a measurement value relating to an electric voltage and/or electric current strength present in the pulse inverter, in particular on the side with the DC distribution bus and/or on the side with the electric machine, wherein the compensation unit is adapted to generating the or a control signal in dependence on the measurement value, and the compensation voltage can be generated by means of this signal.

The pulse inverter and the compensation unit may be configured as a combined component. The pulse inverter and the compensation unit may be situated in a common housing. In this way, an especially space-saving design is realized.

At least one DC voltage component which can be operated by means of a DC voltage can be electrically coupled to the DC distribution bus. The DC voltage component can be a high-voltage battery, in which energy is stored or can be stored in order to propel the motor vehicle, and/or a component of an air conditioning system of the motor vehicle, especially a compressor, and/or a heating component, and/or a charger, by means of which an electric energy accumulator of the motor vehicle, especially the or a high-voltage battery, can be charged.

BRIEF DESCRIPTION OF THE SEVERAL VIEWS OF THE DRAWINGS

Further benefits, aspects and details will emerge from the following embodiments as well as the figures.

DETAILED DESCRIPTION

Figure 1:
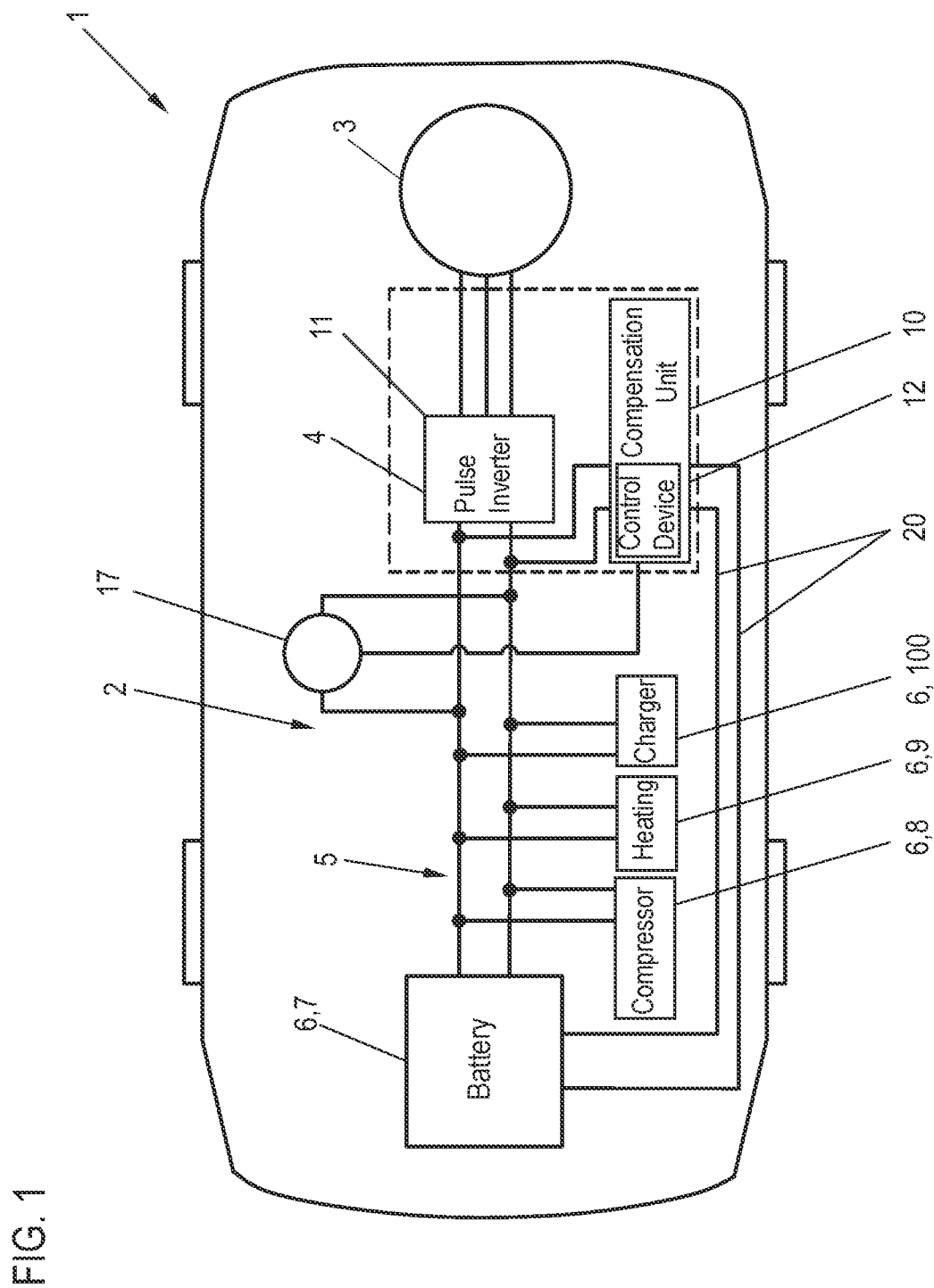
FIG. 1 shows a first embodiment of the motor vehicle.

FIG. 1 shows a first embodiment of a motor vehicle 1, having a high-voltage onboard network 2. The motor vehicle further comprises an electric machine 3, which is electrically coupled across a pulse inverter 4 to a DC distribution bus 5 of the high-voltage onboard network 2. By means of the pulse inverter 4, the alternating voltage present on the side with the electric machine 3 can be transformed into a DC voltage, so that it becomes possible to feed electric energy from the electric machine 3 to the DC distribution bus 5 by means of the pulse inverter 4, and vice versa.

Multiple DC voltage components 6 which can be operated by means of a DC voltage are electrically coupled to the DC distribution bus 5. One of the DC voltage components 6 is a high-voltage battery 7 of the motor vehicle 1, in which energy is or can be stored for the propulsion of the motor vehicle 1. The high-voltage battery 7, which can also be called a traction battery, can be both a consumer and an energy source of the high-voltage onboard network 2. The high-voltage battery 7 is a consumer when the motor vehicle 1 is in a charging mode, for example when it is being charged by means of an outside current source, or when the electric machine 3 is functioning as a generator in the course of a recuperation mode of the motor vehicle 1. The high-voltage battery 7 is an electric energy source when it is feeding energy for the other DC voltage components 6 and/or for the electric machine 3 operating in motor mode to the high-voltage onboard network 2. The high-voltage battery in this case supplies a voltage of 400 Volt, for example.

Moreover, components of an air conditioning system of the motor vehicle not further shown in the figure are provided as a DC voltage component 6, namely, a compressor 8 and a heating component 9. Moreover, a charger 10 is provided as a DC voltage component 6, by means of which the high-voltage battery 7 can be charged.

One problem involving the pulse inverter 4 is that, because of its switching behavior, voltage ripple or simply ripple 38 is caused in the DC distribution bus 5. This represents harmonics, so to speak, in the electric DC voltage present in the DC distribution bus. Since the ripple 38 is detrimental to the operation of the DC voltage components 6 and in the worst case they may even be damaged by the ripple 38, it is necessary to reduce the ripple 38 as much as possible. For this purpose, a compensation unit 10 is provided, being coupled to the DC distribution bus 5. The pulse inverter 4 and the compensation unit 10 are configured as a combined component, for example, as is indicated in FIG. 1 by the dotted box 11. The combined component comprises a common housing, in which the pulse inverter 4 and the compensation unit 10 are arranged.

The compensation unit 10 is adapted to feeding an electric compensation voltage into the DC distribution bus 5, so that the ripple 38 is at least partially compensated. Details regarding this compensating process will be explained below with the aid of FIG. 2, relating to a first embodiment of the method with the aid of the motor vehicle 1 shown in FIG. 1. In order to carry out this method, there is provided a control device 12, in particular, being in the present case part of the compensation unit 10. The method shown in FIG. 2 involves the steps 13-15.

In step 13 of the method, a voltage measurement series 16 is detected or measured, relating to a temporal variation of the electric voltage in the DC distribution bus 5. Thus, pairs of values are detected, in each of which a corresponding voltage value is associated with a definite moment of time. For the detecting of the voltage measurement series 16 there is provided a distribution bus sensor 17, which in the present case is or comprises a voltmeter. The measurement detected by means of the distribution bus sensor 17 are relayed to the control device 12.

In the second step 14 of the method, ripple information 18 is ascertained by means of the control device 12 and with the aid of the voltage measurement series 16. The ripple information 18 describes multiple variables of an oscillation, by means of which the ripple 38 can be described. For example, the ripple information 18 is determined by carrying out a regression analysis with the data of the voltage measurement series 16. Specifically, a sine function is fitted to the corresponding data values, so that the variables determined in connection with the ripple information 18 are the amplitude A, the period P and the phase φ of this oscillation.

The temporal variation of the voltage values of the voltage measurement series 16 is evaluated by means of a sine function, which can be represented by the functional equation:

$$U(t) = U_0 + A \cdot \sin\left(\frac{2\pi}{T} t + \varphi\right).$$

U(t) denotes here the time-dependent values of the voltage in the DC distribution bus 5 and t denotes the time. $U_0$ denotes a constant voltage value in the DC distribution bus 5, A is the amplitude, T is the period or duration of the oscillation, and φ is the phase of the ripple 36. This functional equation can be fitted to the measurement series by means of a $\chi^2$ minimization and in this way the ripple information 18, i.e., the values for A, T and φ, can be determined. $U_0$ can be taken as known, or also be determined as an unknown in the context of this analysis.

In the last step 15 of the method, the ripple information 18 is used to generate a control signal 19, with the aid of which the compensation voltage is generated. For the generating of the compensation voltage, the compensation unit 10 is connected by electric connections 20 to the high-voltage battery 7. The DC voltage provided by the high-voltage battery 7 is modified by the compensation unit 10 such that the voltage imposed by means of the compensation unit 10 on the voltage in the DC distribution bus 5 comprises a voltage variation running counter to the ripple 38. Thus, the ripple 38 is attenuated by feeding the compensation voltage to the DC distribution bus 5. Since the counter oscillations of the voltage fed in are generated in the present example with the aid of a sinusoidal oscillation, yet the ripple 38 present in the DC distribution bus 5 typically does not have an ideal sine shape, the ripple 38 while not completely compensated will be significantly smoothed out.

Steps 13-15 of the method are carried out simultaneously. That is, the detecting of the voltage measurement series 16 always occurs in parallel with the feeding in of the compensation voltage, so that it is possible to respond to any changes in regard to the ripples 38. In particular, allowance is also made for the attenuation of the ripple 38 brought about by the compensation voltage. The simultaneous performance of steps 13-15 begins once the determination of the voltage measurement series 16 performed during step 13 constitutes a sufficient database to carry out the determination of the ripple information 18 with sufficient accuracy in step 14.

Figure 3:
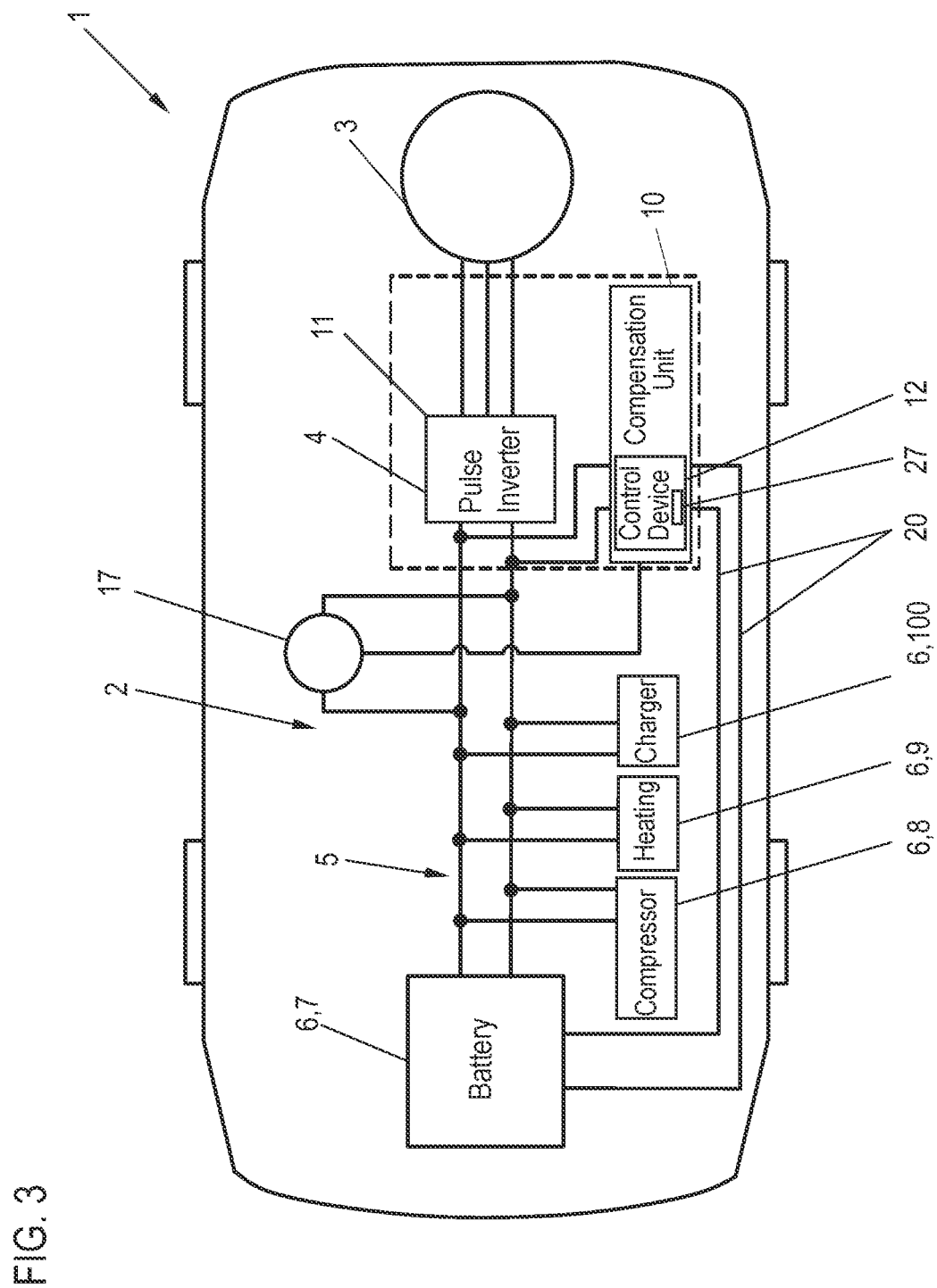
FIG. 3 shows a second embodiment of the motor vehicle.
Figure 4:
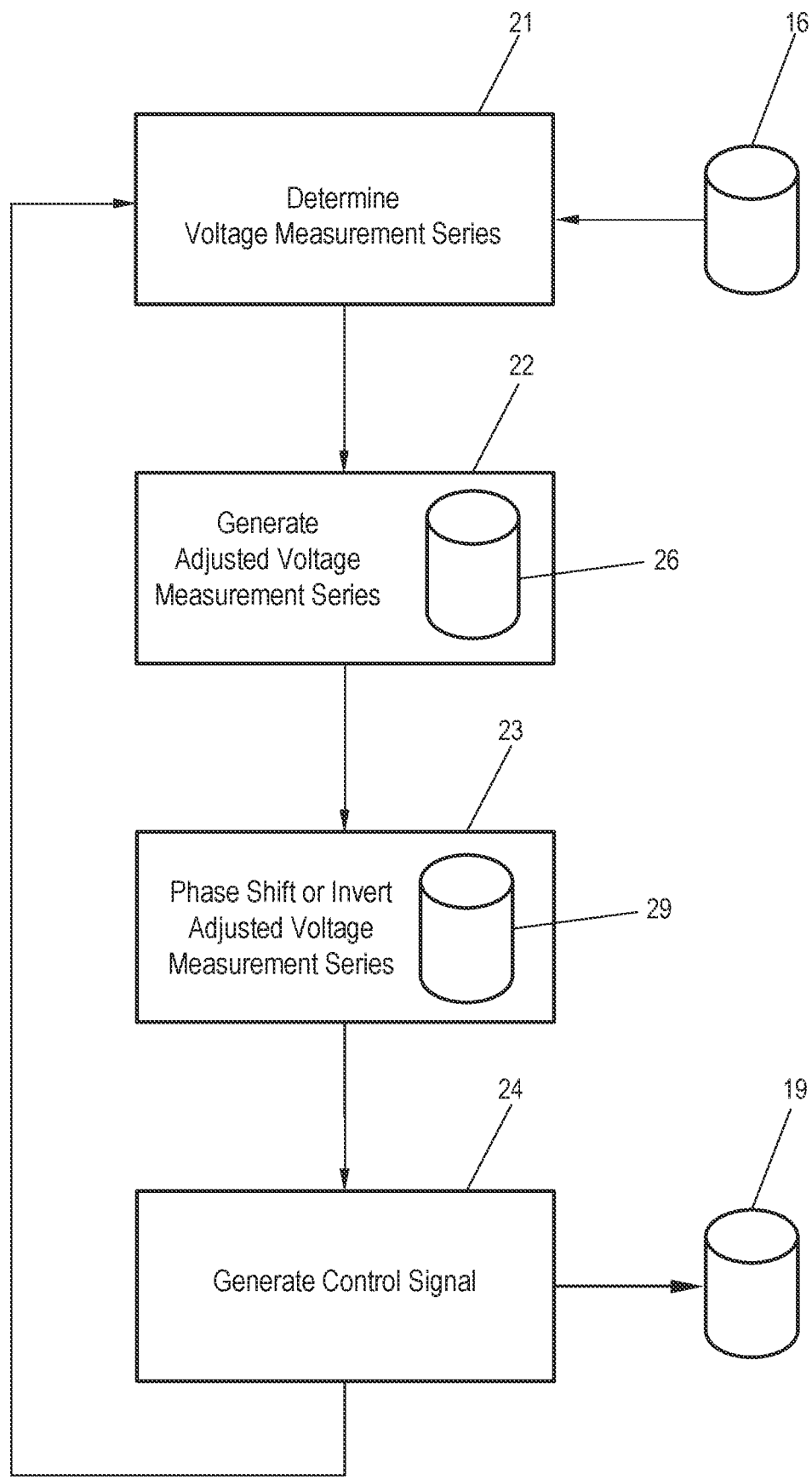
FIG. 4 shows a second embodiment of the method regarding the motor vehicle of FIG. 3.

FIG. 3 shows a second embodiment of the motor vehicle 1, in which the same components have been given the same reference numbers in regard to the motor vehicle 1 of FIG. 1. The differences between these embodiments shall be made clear in the following explanations for FIG. 4, which shows a flow chart of a second embodiment of the method for the motor vehicle 1 shown in FIG. 3. The method explained with the aid of FIG. 4 involves the steps 21-24.

Figure 2:
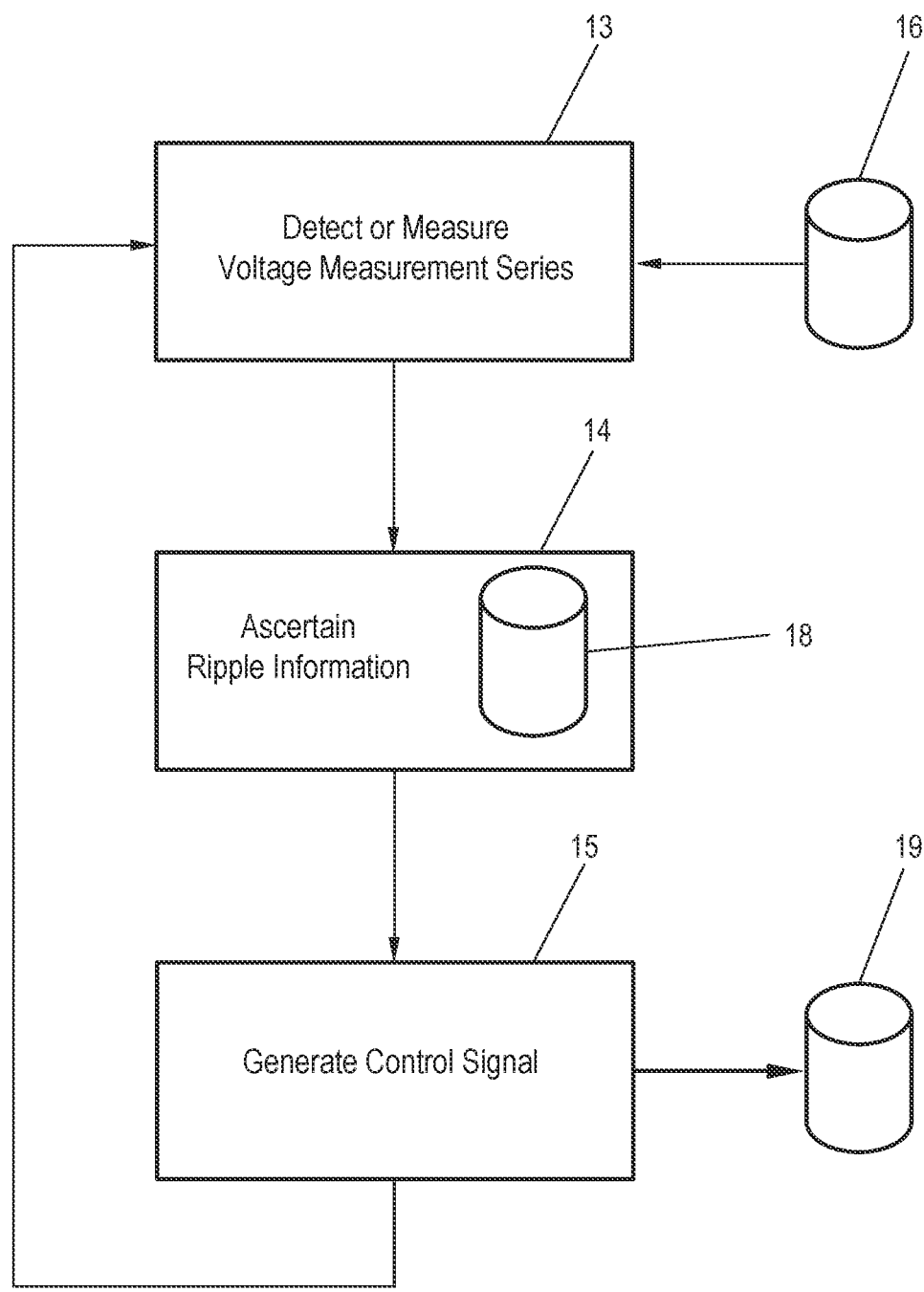
FIG. 2 shows a first embodiment of the method regarding the motor vehicle of FIG. 1.
Figure 5:
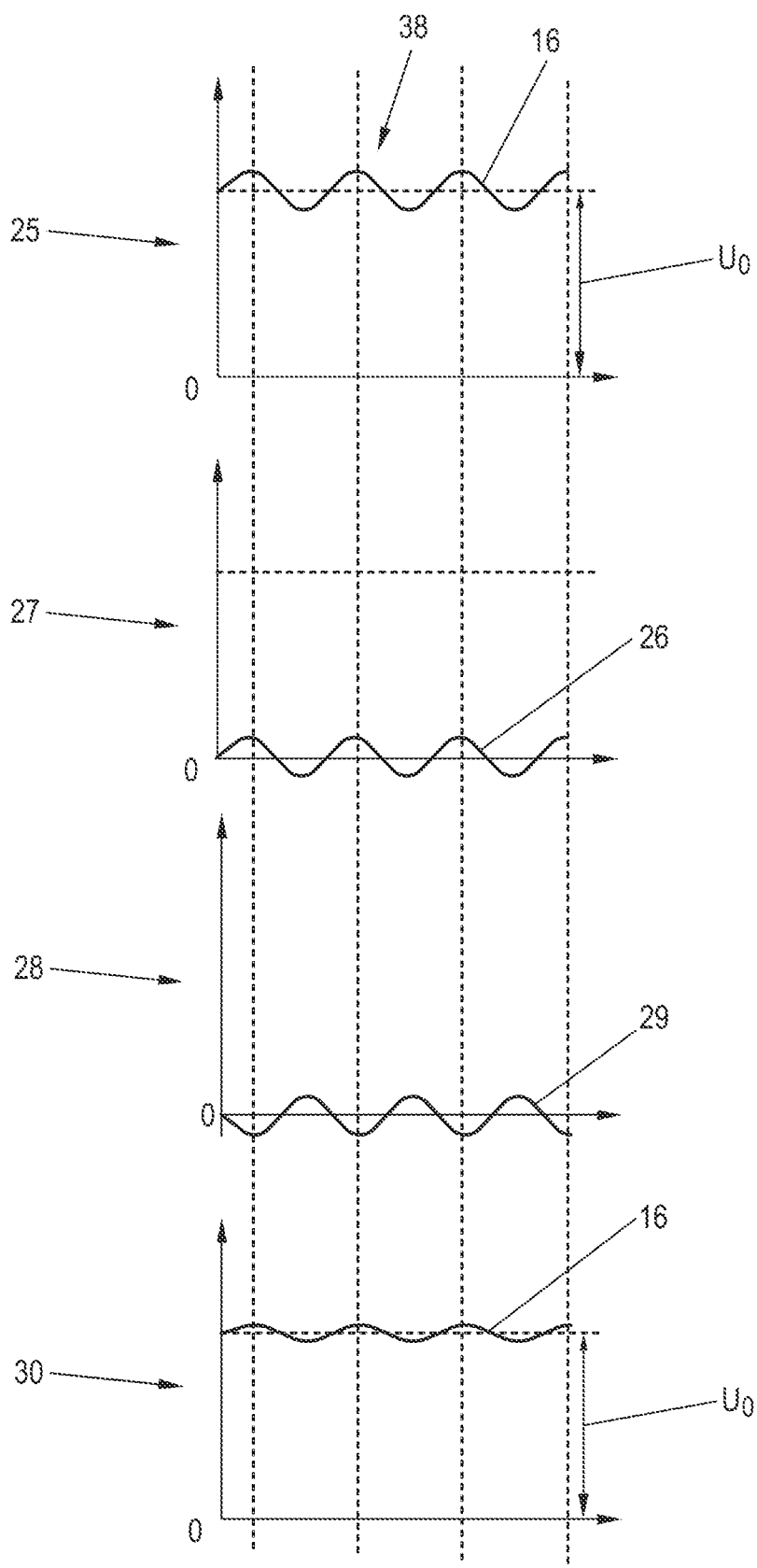
FIG. 5 shows diagrams regarding modification or evaluation of the voltage measurement series acquired in connection with the method presented in FIG. 4.

In the first step 21, the voltage measurement series 16 is determined according to the first step 13 of the method shown in FIG. 2. The top diagram 25 of FIG. 5 shows, for better comprehension, a system of coordinates in which the values of the voltage measurement series 16 have been plotted. The abscissa of this system of coordinates relates to the time and the ordinate relates to the value of the electric voltage present in the DC distribution bus 5. Even though the curve shown in the diagram 25 is a solid line, the voltage measurement series 16 comprises concrete pairs of values and therefore discrete points. The existing ripple 38 is clearly recognizable in the diagram 25, being shown exaggerated for better clarity.

In the next step 22, an adjusted voltage measurement series 26 is generated from the voltage measurement series 16. The adjusted voltage measurement series 26 is generated by subtracting a constant voltage value $U_0$ each time from the measured voltage values of the voltage measurement series 16. The constant voltage value $U_0$ may correspond to the predetermined and known nominal voltage of the DC distribution bus 5 or it can be determined means of the voltage measurement series 16 by forming a mean value from the measured voltage values. The adjusted voltage measurement series 26 is represented in the diagram 27 in FIG. 5. As is evident, this curve has been created by a parallel shifting of the curve represented in the diagram 25 along the y-axis by the value $U_0$. The creation of the adjusted voltage measurement series 26 from the voltage measurement series 16 is done, for example, by the control device 12.

In the next step 23 of the method, the adjusted voltage measurement series 26 is taken to a phase shifting and/or inverting unit 27 of the control device 12. The phase shifting and/or inverting unit 27 inverts the adjusted voltage measurement series 26, that is, the magnitudes of the voltage values present in the adjusted voltage measurement series 26 are reversed.

The result is a modified, adjusted voltage measurement series 29, represented in the diagram 28 in FIG. 5. Alternatively, the modified, adjusted voltage measurement series 29 can be generated by phase-shifting the adjusted voltage measurement series 26 by a half period or 180° by means of the phase shifting and/or inverting unit 27, which in the case of a sinusoidal oscillation is the same as an inverting.

In the last step 24 of the method, the control signal 19 is generated by means of the modified voltage measurement series 29 generated in step 23 and this is used to generate the compensation voltage. The variation of the compensation voltage fed to the DC distribution bus 5 corresponds to the variation of the modified voltage measurement series 29, so that the temporal variations of the compensation voltage and the voltage present in the DC distribution bus 5 run counter to each other and cancel each other out, or at least attenuate each other. The result of this compensation is shown in the diagram 30 in FIG. 5, where the curve 31 plotted in the diagram 30 represents the voltage present in the DC distribution bus 5 as a function of time. As can be seen, the ripples 38 are clearly smoothed out by the described method.

The previous step 22 in the context of the just explained embodiment of the method regarding the generating of the adjusted voltage measurement series 26 is merely optional. Thus, in particular, it is also conceivable for the voltage measurement series 16 to be taken directly to the phase shifting and/or inverting unit 27, which generates the modified voltage measurement series 29 by means of a phase shifting, for example, by 180°. The control signal 19 can likewise depend on the values created in this way.

Figure 6:
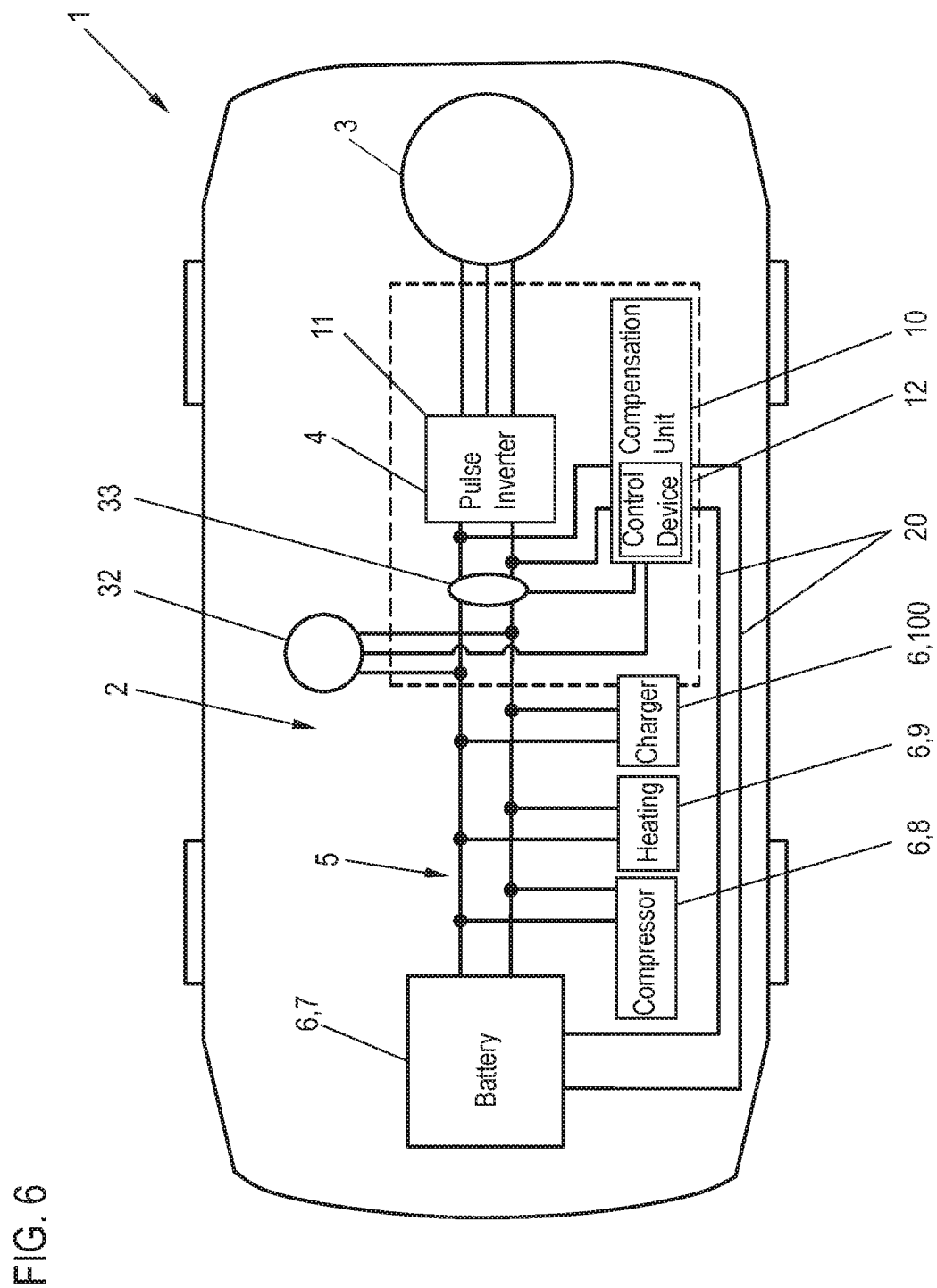
FIG. 6 shows a third embodiment of the motor vehicle.

FIG. 6 shows a third embodiment of the motor vehicle 1, in which, apart from the following explained differences, the aspects explained in connection with the motor vehicles 1 represented in FIGS. 1 and 3 apply equally, and the same components are given the same reference numbers. The motor vehicle represented in FIG. 6 comprises, in place of the distribution bus sensor 17, a first pulse inverter sensor 32 and a second pulse inverter sensor 33. By means of the first pulse inverter sensor 32, an electric voltage which is present in the pulse inverter, namely, on the side with the DC distribution bus 5, can be detected. By means of the second pulse inverter sensor 33, an electric current strength present on the side with the DC distribution bus 5 can be detected in the pulse inverter 4. The measurement values are relayed to the control device 12. The sensors 32, 33 may alternatively be arranged in the pulse inverter 4 on the side with the electric machine 3.

Figure 7:
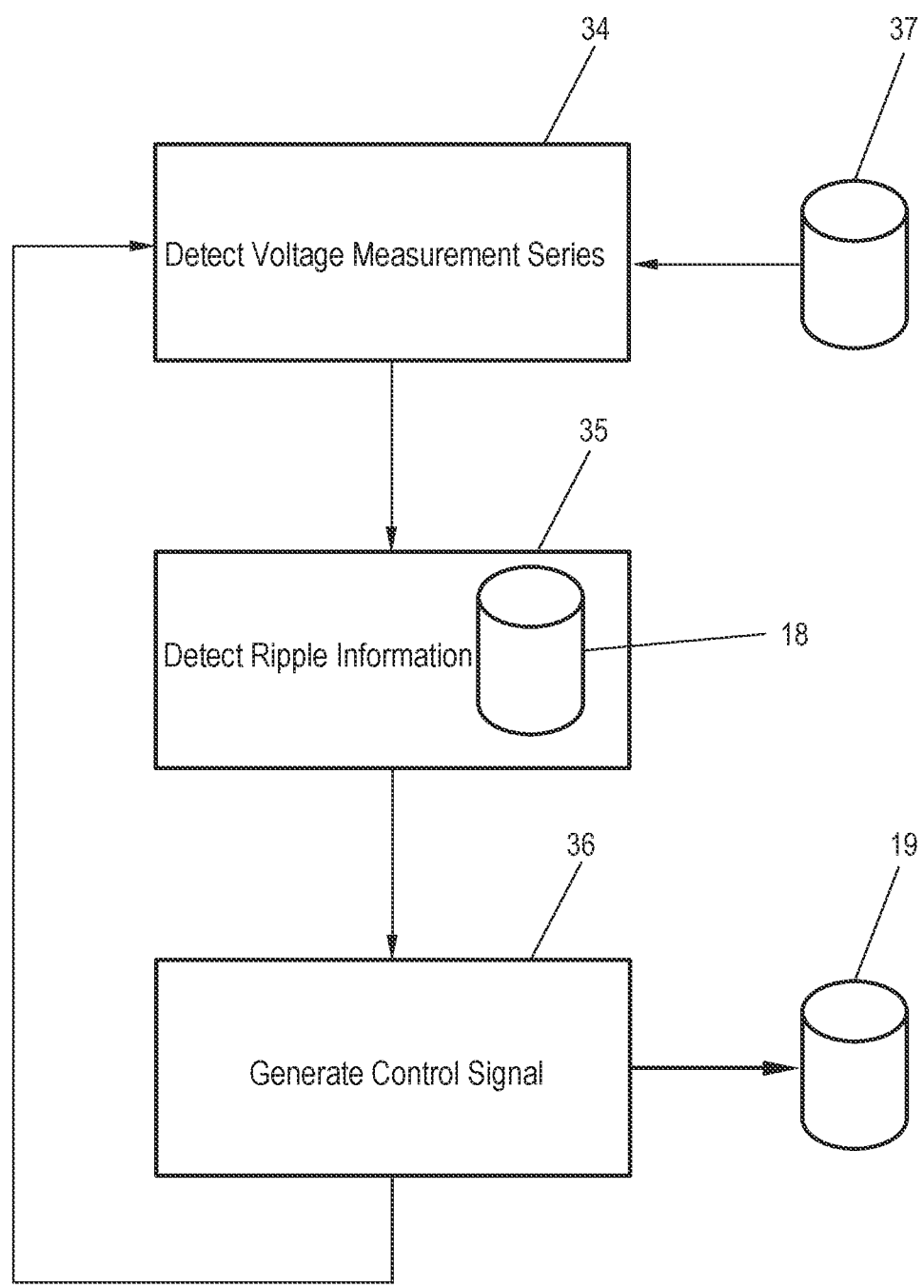
FIG. 7 shows a third embodiment of the method regarding the motor vehicle of FIG. 6.

A third embodiment of the method regarding the motor vehicle 1 of FIG. 6 shall be explained with the aid of the flow chart shown in FIG. 7. This method involves the steps 34-36. In the first step 34, measurement values 37 are detected by the first pulse inverter sensor 32 and the second pulse inverter sensor 33.

As in the second step 14 of the method of FIG. 2, in the second step 35 of the method of FIG. 7 the ripple information 18 is detected. However, the detecting of the ripple information 18 is not done as in the method explained with the aid of FIG. 2 by using voltage values regarding the DC distribution bus 5, but instead by using the measurement values 37 and the known switching behavior of the pulse inverter 4 for this purpose. Thus, a lookup table is kept on the side with the control device 12, in which the ripple information 18, i.e., the amplitude as well as the phase of the anticipated ripple 38, is contained as a function of the voltage and current strength in the region of the pulse inverter 4. The measurement values to be detected can therefore be detected with a shorter time resolution than that in the embodiment explained with the aid of FIG. 2, since the ripple 38 does not need to be detected explicitly and time-resolved in the method explained with the aid of FIG. 7.

By means of the ripple information 18 generated in this way, the control signal 19 is generated in the last step 36 of this method, and the details explained in connection with the last step 15 of the method explained in FIG. 2 likewise apply here.

In particular, it can also be provided that the first embodiment and the third embodiment of the motor vehicle 1 and the first embodiment and third embodiment of the method are combined. In this case, the determination of the ripple information 18 is done on the one hand with the aid of the measurement data of the distribution bus sensor 17 and on the other hand with the aid of the measurement data of the first pulse inverter sensor 32 and the second pulse inverter sensor 33. The ripple information 18 can be generated even more precisely and verified in regard to consistency by using this expanded database.

German patent application no. 10 2021 123322.4, filed Sep. 9, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a motor vehicle having at least one electric machine electrically coupled across a pulse inverter to a Direct Current (DC) distribution bus of an onboard voltage network of the motor vehicle, the method comprising:
   measuring a voltage measurement series relating to a time variation of a DC voltage present in the DC distribution bus;
   generating a control signal based on the voltage measurement series;
   generating an electric compensation voltage based on the control signal; and
   feeding, by a compensation unit electrically coupled to the DC distribution bus, the electric compensation voltage to the DC distribution bus such that a ripple of the DC voltage present in the DC distribution bus caused by the pulse inverter is at least partly compensated.

2. The method according to claim 1, further comprising:
   determining at least one item of ripple information based on the voltage measurement series, the ripple information relating to at least one variable of an oscillation describing the ripple; and
   generating the control signal based on the ripple information.

3. The method according to claim 2 wherein the at least one variable is an amplitude, a period, or a phase of the oscillation describing the ripple.

4. The method according to claim 1, further comprising:
   generating the voltage measurement series or an adjusted voltage measurement series by subtracting a constant voltage value from measured voltage values of the voltage measurement series, wherein the constant voltage value is a constant component of the DC voltage present in the DC distribution bus;
   relaying the voltage measurement series or the adjusted voltage measurement series to a phase shifting or inverting unit;
   generating a modified voltage measurement series by phase-shifting the voltage measurement series by a substantially half period of the ripple or by phase-shifting or inverting the adjusted voltage measurement series by a substantially half period of the ripple; and
   generating the control signal based on the modified voltage measurement series.

5. The method according to claim 1, further comprising:
   measuring at least one measurement value relating to an electric voltage or electric current strength present in the pulse inverter, on a side with the DC distribution bus or on a side with the electric machine;

determining, based on the measurement value and a known switching behavior of the pulse inverter, at least one item of or ripple information, wherein the at least one item of or the ripple information relates to at least one variable of an oscillation describing the ripple; and generating the control signal based on the ripple information.

6. A motor vehicle, comprising:

at least one electric machine electrically coupled across a pulse inverter to a Direct Current (DC) distribution bus of an onboard voltage network of the motor vehicle;

at least one distribution bus sensor which, in operation, measures a voltage measurement series relating to a time variation of a DC voltage present in the DC distribution bus; and a compensation unit electrically coupled to the DC distribution bus, wherein the compensation unit, in operation, generates a control signal based on the voltage measurement series, generates an electric compensation voltage based on the control signal, and feeds the electric compensation voltage into the DC distribution bus such that a ripple of the DC voltage present in the DC distribution bus caused by the pulse inverter is at least partly compensated.

7. The motor vehicle according to claim 6, wherein a control device of the compensation unit, in operation, generates the control signal based on the voltage measurement series.

8. The motor vehicle according to claim 6, wherein the compensation unit includes at least one phase shifting or inverting unit which, in operation, generates a modified voltage measurement series by phase-shifting the voltage measurement series by substantially half a period of the ripple or by phase-shifting or inverting an adjusted voltage measurement series, which has been generated by subtracting from measured voltage values of the voltage measurement series a constant voltage value, being a constant component of the DC voltage present in the DC distribution bus, by substantially half a period of the ripple, and the compensation unit is adapted to generating the control signal based on the modified voltage measurement series.

9. The motor vehicle according to claim 6, further comprising:

at least one pulse inverter sensor which, in operation, measures a measurement value relating to an electric voltage or electric current strength present in the pulse inverter, on a side with the DC distribution bus or on a side with the electric machine, wherein the compensation unit, in operation, generates a control signal based on the measurement value, and the electric compensation voltage is generated using the control signal.

10. The motor vehicle according to claim 6, wherein the pulse inverter and the compensation unit are configured as a combined component.

11. The motor vehicle according to claim 6, wherein at least one DC voltage component which can be operated by at least one DC voltage is electrically coupled to the DC distribution bus, wherein the at least one DC voltage component is a battery in which energy is stored or can be stored in order to propel the motor vehicle, or a component of an air conditioning system of the motor vehicle, or a charger by which an electric energy accumulator of the motor vehicle is charged.

12. The motor vehicle according to claim 11 wherein the at least one DC voltage component of the air conditioning system of the motor vehicle is a compressor or a heating component.

13. The motor vehicle according to claim 11 wherein the electric energy accumulator of the motor vehicle is the battery.

* * * * *